Oct. 10, 1972 — J. BAUDE — 3,697,325
PURGE CONTROL FOR FUEL CELL
Filed Aug. 21, 1969 — 2 Sheets-Sheet 1

OUTPUT PULSES FROM VOLTAGE-TO-FREQUENCY CONVERTER

BUILDUP OF VOLTAGE ON STORAGE CAPACITOR 60 OF STAIRCASE WAVE GENERATOR

OUTPUT PULSES FROM STAIRCASE WAVE GENERATOR

Inventor
John Baude
By Lee H. Kaiser
Attorneys

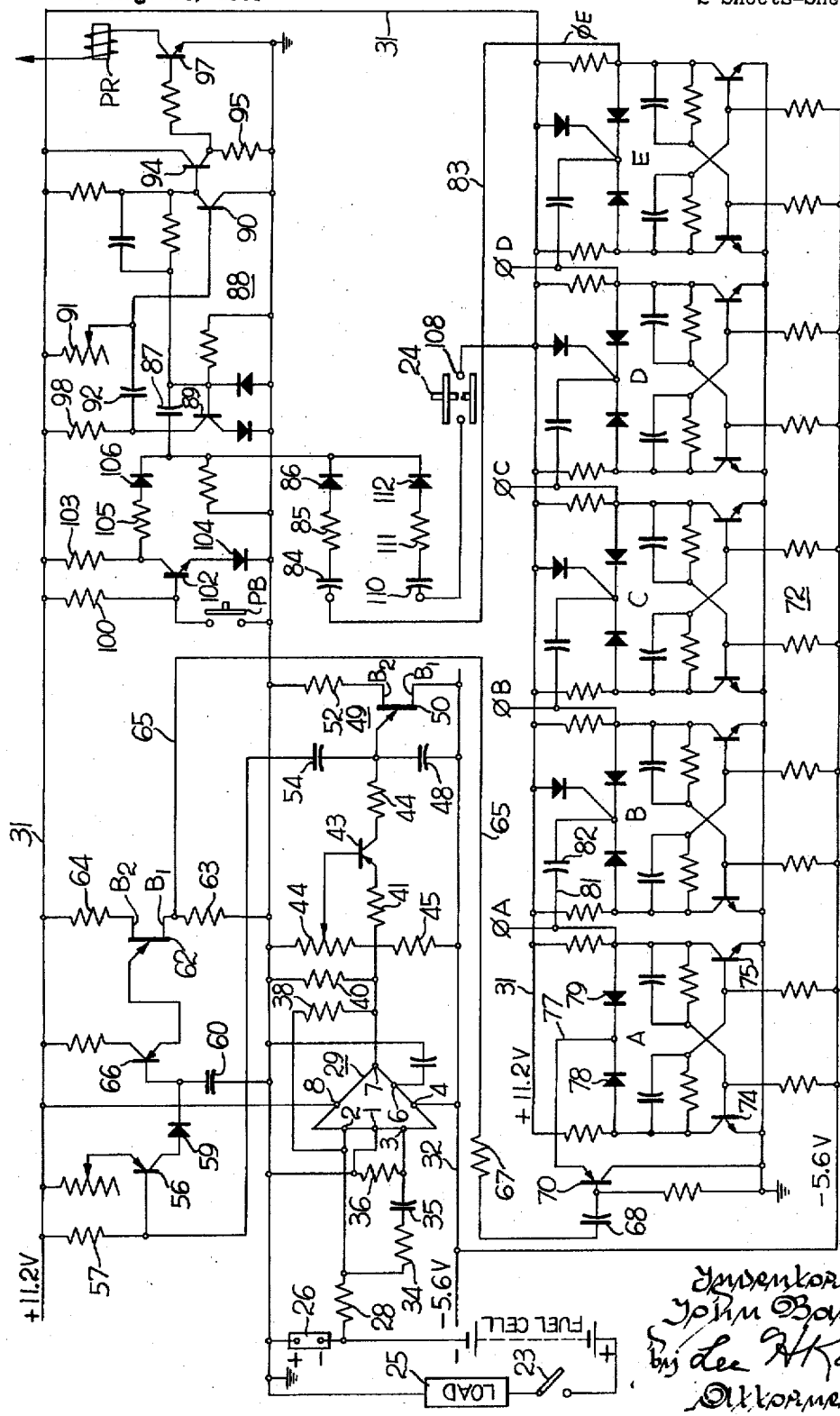

United States Patent Office 3,697,325
Patented Oct. 10, 1972

3,697,325
PURGE CONTROL FOR FUEL CELL
John Baude, Milwaukee, Wis., assignor to
Isotopes, Inc., Westwood, N.J.
Filed Aug. 21, 1969, Ser. No. 851,948
Int. Cl. H01m 27/12
U.S. Cl. 136—86 B                  19 Claims

ABSTRACT OF THE DISCLOSURE

Impurities accumulated within a fuel cell from the reactants are flushed from the cell by periodic operation of valves which permit reactant flow at a sufficiently high rate to purge, i.e., clean the cell plates. Operation of the valves is governed by the ampere-hour output of the fuel cell. The voltage developed by the flow of fuel cell load current through a shunt controls the frequency of output pulses from a voltage-to-frequency converter, and the pulses are supplied to frequency dividing means including a binary type counter which controls the purge valves. The submultiple of the input pulse frequency to the counter is selectively variable to adjust the number of ampere-hours between purges, and the frequency dividing means includes a monostable multivibrator whose period is selectively variable to adjust the duration of each purge.

---

This invention relates to fuel cells and in particular to controls for fuel cells.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

A fuel cell is an electrochemical device that converts the free energy of a chemical reaction directly to electrical energy. In an individual fuel cell an oxidation half-cell reaction takes place at an electrode called the anode to which a reactant, referred to as the fuel, is supplied and is electro-chemically oxidized to release electrons to the anode. The other half-cell reaction takes place simultaneously at another electrode, called the cathode which is spaced from the anode by a suitable electrolyte. A reactant called the oxidant is supplied to the cathode where it is electrochemically reduced to take up electrons from the cathode. In hydrogen-oxygen fuel cells, the fuel is hydrogen and the oxidant is oxygen, and the two half-cell reactions result in the cathode tending to have a deficiency of electrons and the anode tending to have an excess. This tendency is relieved by the transfer of charge electronically through an external load connecting the electrodes accompanied by the ionic transfer of charge through the electrolyte. A plurality of individual fuel cells are usually connected in parallel to provide the desired output and is known as a module, and production of electrical energy continues as long as fuel and oxidant are supplied to the electrodes.

The anode and cathode electrodes may be of porous material such as sintered nickel separated by an asbestos capillary matrix which contains an aqueous potassium hydroxide electrolyte such as disclosed in U.S. Pat. 3,222,223 to John L. Platner which has the same assignee as this invention. $H_2$ and $O_2$ cell plates adjacent the electrodes provide passageways for distributing the gaseous hydrogen and oxygen reactants over the surface of the electrodes and serve as current collectors. During operation, the fuel cell collects impurities from the reactants which reduce its efficiency. The amount of impurities accumulated on the fuel cell electrodes is a function of the purity of the reactant gases and volume of the reactant gases consumed, the latter being proportional to the current supplied by the fuel cell. The $H_2$ and $O_2$ cell plates may be periodically cleaned by flushing the cell with reactants. This action is called purging. Purging comprises the movement of hydrogen and oxygen at a sufficiently high rate through the cell plates to clean them of deposits of the impurities contained in the reactants.

It is an object of the invention to provide a control for periodically flushing a fuel cell with reactants to remove impurities whenever the fuel cell is providing an output.

A further object is to provide such a control which is governed by the ampere-hour output of the fuel cell.

Another object is to provide such a control which regulates both the frequency and duration of the purges. An object of the preferred embodiment is to provide such a control wherein the frequency of purging is a function of the ampere-hour output of the fuel cell and the number of ampere-hours between purges is selectively variable and the duration of each purge is also selectively variable.

These and other objects and advantages of the invention will be more readily apparent from the following detailed description when considered in conjunction with the accompanying drawing wherein:

FIG. 2 is a schematic circuit diagram of the preferred embodiment of the invention;

Figure 3A:
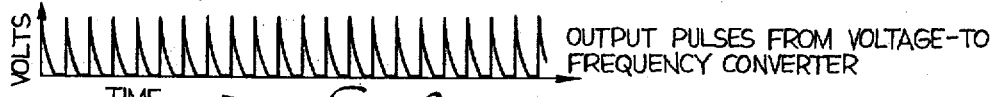
Figure 3B:
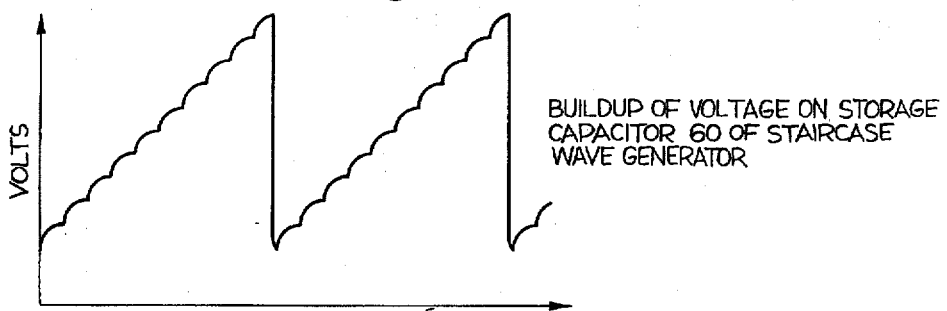
Figure 3C:
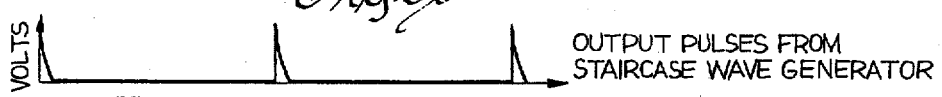
Figure 4:
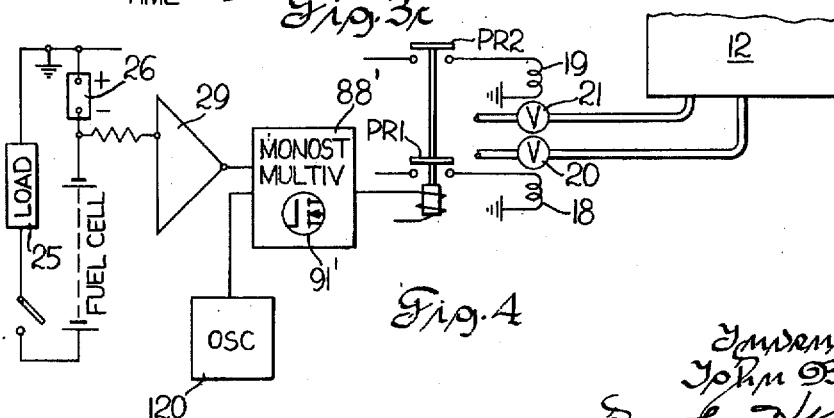

FIGS. 3a, 3b and 3c, respectively, represent in the circuit shown in FIG. 2: (a) output pulses from the voltage-to-frequency converter; (b) the "staircase" buildup of voltage across the storage capacitor; and (c) the output pulses from the staircase wave generator which are the input pulses to the frequency divider; and FIG. 4 represents an alternative embodiment of the invention in block form.

Figure 1:
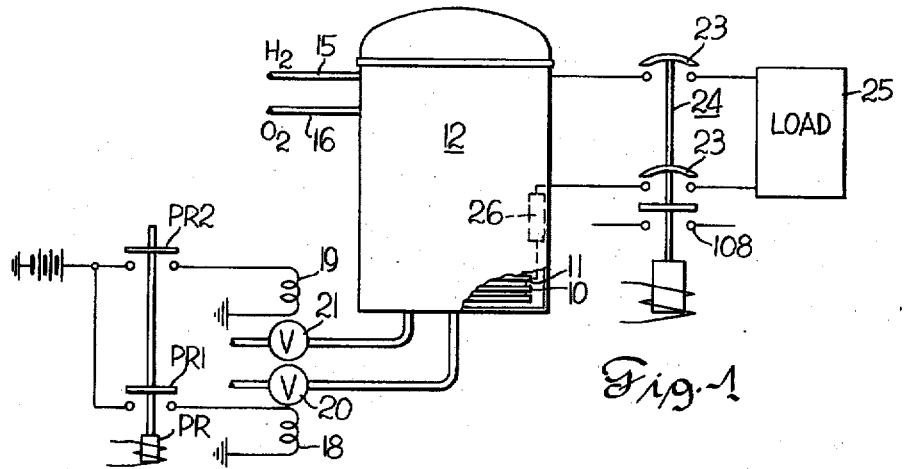
FIG. 1 is a schematic representation of a fuel cell embodying the purge control of the invention.

A fuell cell embodying the invention schematically represented in FIG. 1 may comprise a plurality of anode electrodes and cathode electrodes with $H_2$ and $O_2$ cell plates 10 and 11 adjacent thereto arranged in a stack and enclosed in a cannister 12. Preferably the stack of electrodes may comprise a plurality of two-cell sections (not shown) wherein the cells are connected in parallel and the sections are connected in series to provide the desired output voltage. The $H_2$ and $O_2$ cell plates 10 and 11 serves as passageways for distributing over the surface of the electrodes the gaseous hydrogen and oxygen reactants supplied to cannister 12 through conduits 15 and 16, and the cell plates 10 and 11 also serves as current collectors and provide thermal control for the electrodes.

The amount of impurities accumulated by the fuel cell electrodes is proportional to both the purity of the gas reactants and the amount of reactants used. The amount of reactants used is a function of the number of ampere-hours supplied by the fuel cell when it is connected by the contacts 23 of a circuit breaker 24 to a load 25. Scheduled purging may be accomplished by closure of normally open contacts PR1 and PR2 of a purge relay PR to apply brief but accurately timed pulses to the operating coils 18 and 19 of normally closed valves 20 and 21 which open when coils 18 and 19 are energized to permit movement of the hydrogen and oxygen gases through the $H_2$ and $O_2$ electrodes at a sufficiently high rate to clean them of accumulated impurities.

The purge sequence provided by the preferred embodiment of the invention is referenced to the ampere-hours supplied by the fuel cell to load 25. A low resistance shunt 26 carries the load current of the fuel cell and may comprise a resistive mat embedded within plastic and shown schematically in doted lines in FIG. 1 as disposed with an air duct (not shown) within cannister 12 through which a coolant gas is circulated. One side of shunt 26 is connected to the ground bus as shown in FIG. 2, and the voltage drop developed across shunt 26 by the load current is coupled from the negative terminal of the shunt 26 through a resistor 28 to the inverting terminal 2 of a differential amplifier 29. Diffierential amplifier 29 may be of the operational amplifier, integrated circuit type and receives power over conductors 31 and 32 from a power supply (not shown) which maintains bus 31 at a regulated positive potential such as +11.2 volts relative to ground and bus 32 at a regulated negative potential such as −5.6 volts relative to ground. Resistor 28 protects amplifier 29 in the event that the connection to shunt 26 is not made correctly. The series arrangement of a resistance 34 and a capacitor 35 connects the noninverting terminal 3 of amplifier 29 to the inverting terminal 2 to stabilize the amplifier and a resistance 36 connects the noninverting terminal 3 to ground and to the + terminal of shunt 26. A feedback resistor 38 connects the output terminal 7 of the amplifier 29 to the inverting input 2 to reduce the amplification factor from a very high value to approximately one hundred and thus provide linearity of output with respect to input.

The output from differential amplifier 29 appearing between terminal 7 and ground is applied across a resistance 40. The voltage developed across reistor 40 is linearly related to the input voltage to the amplifier 29 and thus is proportional to the load current supplied by the fuel cell. The voltage across resistor 40 is coupled through a resistance 41 to the emitter of a transistor 43 which is connected as a constant current amplifier. The base of transistor 43 is coupled to the slider of a potentiometer 44 which is connected in series with a resistance 45 to form a voltage divider between the −5.6 volt bus 32 and the ground bus. The current flowing through resistance 41, the emitter-collector junction of transistor 43 and a collector resistance 44 is a linear function of the input voltage to differential amplifier 29, and thus of the load current supplied by the fuel cell, and supplies constant charging current to a capacitor 48 of a voltage-to-frequency converter 49 comprising a unijunction relaxation oscillator. Capacitor 48 is connected to the emitter of a unijunction transmitter 50 of the relaxation oscillator having its base $B_1$ connected to the −5.6 volt bus 32 and its base $B_2$ connected through a resistance 52 to the ground bus. The frequency of the relaxation oscillator is proportional to the magnitude of current charging capacitor 48 and thus to the voltage developed across shunt 26 by the load current flowing therethrough, and the frequency of the relaxation oscillation may be adjusted by potentiometer 44 to permit calibration of the number of ampere-hours supplied by the fuel cell between purges. The output pulses from the relaxation oscillator shown in FIG. 3a appearing at the emitter of unijunction transistor 50 are coupled through a capacity 54 to the base of a transistor 56 which is normally reverse biased to a nonconducting state through a resistance 57 connecting the base to the +11.2 volt bus 31. The voltages developed across resistor 57 by the pulses from the voltage-to-frequency converter 49 periodically turn on transistor 56 to pass a charging current pule through a diode 59 to a storage capacitor 60 of a staircase wave generator.

The charging current pulses passed by transistor 56 build up a voltage across storage capacity 60 which increases in steps and resembles a staircase and is schematically represented in FIG. 3b. The staircase wave generator includes a unijunction tarnsistor 62 having base $B_1$ and base $B_2$ connected through resistances 63 and 64 respectively between the ground bus and the +11.2 volt bus 31 and its emitter coupled to storage capacitor 60 through a transistor 66 connected as an emitter follower to provide a high input impedance. When the "staircase" voltage across storage capacitor 60 shown in FIG. 3b builds up to its peak point, unijunction transistor 62 fires and the current flow through resistor 63 generates a pulse (shown schematically in FIG. 3c) which is coupled over a conductor 65 and through a resistance 67 and a capacitance 68 to the base of an input transistor 70 of a frequency divider, or countdown circuit 72.

The number of input pulses (shown in FIG. 3c) from the staircase wave generator to the countdown circuit 72 is too high to directly control the purging valves 20 and 21 (see FIG. 1) and must be reduced in the countdown circuit 72, which may be a well-known decade counter. As shown in FIG. 2, frequency divider 72 comprises five stages of conventional bistable multivibrators, or collector triggered flip-flops A, B, C, D and E each of which is capable of operating in two stable states. Each flip-flop A, B, C, D and E may comprise a pair of transistors, such as 74 and 75 of the first stage A, connected with regenerative feedback so that the two transistors 74 and 75 alternately assume opposite states of conduction one OFF and one ON when a trigger pulse is injected. Transistors 74 and 75 change states abruptly when transistor 70 is turned on by a pulse from the staircase wave generator and delivers a trigger pulse over conductor 77 and through diodes 78 and 79 to collectors of transistors 74 and 75, thereby turning the ON transistor off and causing flip-flop A to change states. On the succeeding trigger pulse over conductor 77, flip-flop A will again switch states. An output trigger pulse is delivered from flip-flop A over conductor 81 through capacitor 82 to flip-flop B each time transistor 75 is turned ON and such action results in a division of the input frequency to flip-flop A by two, i.e., flip-flop B receives one trigger pulse over conductor 81 for each two trigger pulses over conductor 77 to flip-flop A.

As shown in FIG. 2, an output pulse is delivered from output terminal $\phi_E$ over conductor 83 from the fifth stage E of the frequency divider 72 for each 32 input trigger pulses over conductor 77 to flip-flop A. However, output terminals $\phi_A$, $\phi_B$, $\phi_C$, $\phi_D$ and $\phi_E$ from flip-flops A, B, C, D and E respectively permit selection of the desired submultiple of the input pulse recurrence frequency to flip-flop A at which an output pulse is generated by countdown circit 72, thereby permitting selection of the desired number of ampere-hours delivered by the fuel cell to the load before frequency divider, or binary countdown circuit 72 provides an output pulse.

A monostable multivibrator 88 including transistors 89 and 90 is normally maintained in its stable state with transistor 89 OFF and transistor 90 held ON by the base current flowing through a potentiometer 91. The output pulse from flip-flop E of the frequency divider appearing on terminal $\phi_E$ is coupled through conductor 83 and the series arrangement of a capacitor 84, a resistance 85, a diode 86, and a capacitor 87 to the base of transistor 89 and turns transistor 89 ON to accomplish a scheduled purging of the fuel cell electrodes. The voltage excursion at the collector of transistor 89 is coupled through capacitor 92 to the base of transistor 90 and turns it OFF, thereby removing the clamp from the base of a transistor 94 and permitting it to turn ON. When transistor 94 conducts, the voltage drop across a resistor 95 connected to its emitter forward biases the base of a transistor 97 and turns it ON. Conduction of transistor 97 results in current flow through the operating coil of relay PR which operates to close its contacts PR1 and PR2 (see FIG. 1) thereby completing energizing circuits to the valve operating coils 18 and 19 which open valves 20 and 21 and permit flow of the gaseous reactants through the fuel cell at a sufficiently high rate to purge it of impurities.

In the quiescent state of monostable multivibrator 88, both ends of capacitor 92 are at the potential of bus 31 so that capacitor 92 is discharged. When transistor 89 is turned ON by the signal over conductor 83 from the frequency divider, the voltage excursion at the collector transistor 89 lowers the potential of both ends of capacitor 92. One end of capacitor 92 is clamped to ground by transistor 89, but the other end is floating and begins to charge through potentiometer 91. When capacitor 92 becomes charged to a predetermined potential, the base of transistor 90 becomes forward biased, transistor 90 turns ON and transistor 89 turns OFF, thereby returning monostable multivibrator 88 to its stable state. Conduction by transistor 90 clamps the base of transistor 94 to ground, thereby turning it OFF and removing the forward bias from the base of transistor 97, which then turns OFF and deenergizes the operating coil of relay PR. Relay PR releases to open contacts PR1 and PR2 to deenergize the valve operating coils 18 and 19, thereby closing valves 20 and 21 and completing the purge cycle.

The duration of the purge cycle can be selectively varied from approximately 1 to 3 seconds by adjustment of potentiometer 91. The number of ampere-hours between purges can be selectively varied by connection of the desired output terminal $\phi_A$, $\phi_B$, $\phi_C$, $\phi_D$ or $\phi_E$ from the frequency divider 72 to the monostable multivibrator. For example, a purge may occur after each 0.75 amperehour delivered by the fuel cell if conductor 83 is connected to terminal $\phi_A$; a purge may occur after each 1.5 amperehours if conductor 83 is connected to terminal $\phi_B$; a purge may occur after each 3 ampere-hours supplied by the fuel cell if conductor 83 is connected to output terminal $\phi_C$, etc. Further, potentiometer 44 permits adjustment of the frequency of the voltage-to-frequency converter 49 for a predetermined input voltage to differential amplifier 29 and thereby allows calibration of the number of ampere-hours between purges in addition to the selection afforded by connection of conductor 83 to one of the output terminals $\phi_A-\phi_E$.

In the preferred embodiment illustrated in FIG. 2, the frequency of the purges, i.e., the number of ampere-hours supplied by the fuel cell between purges, is selectively variable by connecting conductor 83 to the desired frequency divider output terminal $\phi_A-\phi_E$, while the duration of the purges is constant (although selectively variable by adjustment of potentiometer 91). It will be appreciated that purging can be accomplished at a fixed frequency independent of the amount of reactant consumption by triggering monostable multivibrator 88 from the output of an oscillator (not shown) having a sufficiently high frequency to assure removal of impurities when the maximum volume of gaseous reactants is being consumed during fuel cell operation. Such arrangement would waste the gaseous reactants. In the alternative embodiment illustrated in block form in FIG. 4, the frequency of purging is fixed but the duration of purges is varied as a function of the output supplied by the fuel cell to the load 25. An oscillator 120 may periodically trigger a monostable multivibrator 88', which may be similar to multivibrator 88 of the preferred embodiment, to provide constant frequency of purges independent of ampere-hours supplied by the fuell cell. A voltage controlled variable resistor such as a field effect transistor 91' whose impedance can be regulated by the voltage applied to its gate may be utilized in the RC timing circuit (in place of the potentiometer 91 of the FIG. 2 embodiment) of the monostable multivibrator 88' and its impedance controlled from the output of differential amplifier 29 so that the period of the monostable multivibrator 88', and thus the duration of each purge, is a function of the current being supplied by the fuel cell to the load 25.

Manual purging of the fuel cell can be accomplished in the embodiment of FIG. 2 in addition to the scheduled rent supplied by the fuel cell. Operation of a pushbutton purging which is a function of ampere-hours of load current PB connected in series with a resistance 100 between the +11.2 volt bus 31 and the ground bus reverse biases the base of a transistor 102 whose emitter-collector junction is connected in series with a resistance 103 and a diode 104 between the +11.2 volt bus 31 and the ground bus, thereby turning transistor 102 OFF and transmitting a trigger pulse from the collector of transistor 102 through a resistance 105, a diode 106, and capacitor 87 to the base of transistor 89. This causes transistor 89 to turn ON and the monostable multivibrator to assume its unstable state with the consequent operation of relay PR and the opening of valves 20 and 21 to purge the fuel cell.

When circuit breaker 24 is initially operated to connect the fuel cell to load 25 after the fuel cell has warmed up, auxiliary contacts 108 on the circuit breaker are closed, thereby transmitting a pulse from the +11.2 volt bus 31 through the series arrangement of a capacitor 110, a resistance 111, a diode 112, and capacitor 87 to the monostable multivibrator 88. This causes the monostable multivibrator 88 to assume its unstable state and effect opening of valves 20 and 21 to purge the fuel cell in the manner described hereinbefore.

It will thus be appreciated that the preferred embodiment of the invention provides three modes of purging the fuel cell electrodes of impurities which have been deposited during operation of the fuel cell.

The preferred embodiment of the invention integrates fuel cell load current with respect to time and purges the fuel cell electrode at intervals which are linearly proportional to ampere-hours. It will be appreciated that a nonlinear relation between the rate of purging and amperehours can be accomplished by substituting a nonlinear control element for constant current amplifier transitor 43 or for unijunction transistor 50.

It should be understood that I do not intend to be limited to the particular embodiment shown and described for many modifications and variations thereof will be obvious to those skilled in the art.

The embodiments of the invention in which an exclusive property or privilege is claimed are defined as follows:

1. In combination with a fuel cell having electrodes and adapted to supply current to a load,
   means for supplying reactants to said electrodes,
   valve means for permitting flow of said reactants at a sufficiently high rate to purge said fuel cell of accumulated impurities when said valve means is operated, and
   automatic means responsive to the number of amperehours supplied by said fuel cell to said load for periodically operating said valve means by opening said valve means when said ampere-hours reach a predetermined value as a function of the amount of reactants used and by closing said valve means after a predetermined time when the electrodes have been cleaned of accumulated impurities.

2. In the combination of claim 1 wherein said valve operating means controls both the frequency of operation of said valve means and the duration of vavle operation.

3. In the combination of claim 2 wherein said valve operating means includes means for operating said valve means at a constant frequency and means for controlling the duration of valve operation as a function of the output supplied by said fuel cell to said load.

4. In combination with a fuel cell having electrodes and adapted to supply current to a load,
   means for supplying reactants to said electrodes,
   valve means for permitting flow of said reactants at a sufficiently high rate to purge said fuel cell of accumulated impurities when said valve means is operated,
   automatic means responsive to the number of amperehours supplied by said fuel cell to said load for periodically operating said valve means as a function of the number of ampere-hours supplied by said fuel cell to said load by opening said valve means when said ampere-hours reach a predetermined value as a function of the amount of reactants used and by closing said valve means after a predetermined time when the electrodes have been cleaned of accumulated impurities, and
   means for controlling the period of valve operation.

5. In the combination of claim 4 wherein said valve operating means includes means for generating a voltage which is a function of the magnitude of the current supplied by said fuel cell to said load and a voltage-to-frequency converter responsive to the magnitude of said voltage.

6. In the combination of claim 5 wherein said valve operating means also includes a linear operational amplifier receiving said voltage as an input, a constant charging current amplifier coupled to the output of said operational amplifier and said voltage-to-frequency converter is a unijunction relaxation oscillator coupled to said constant charging current amplifier.

7. In the combination of claim 5 wherein said voltage generating means includes a low resistance shunt carrying at least a portion of said load current.

8. In the combination of claim 7 wherein said voltage-to-frequency converter includes a relaxation oscillator and said valve operating means also includes an amplifier having its input coupled to said shunt and a constant charging current amplifier between said amplifier and said relaxation oscillator.

9. In the combination of claim 8 wherein said valve operating means also includes a staircase wave generator coupled to the output of said relaxation oscillator and a frequency divider connected to receive the output of said staircase wave generator.

10. In the combination of claim 9 wherein said valve operating means also includes a monostable multivibrator coupled to the output of said frequency divider and operates said valve means in response to the switching of said monostable multivibrator to its unstable stage and releases said valve means when said monostable multivibrator regains its stable state.

11. In the combination of claim 5 wherein said voltage-to-frequency converter provides a succession of pulses at a frequency which is a function of the magnitude of said voltage and said valve operating means also includes frequency dividing means coupled to said voltage-to-frequency converter and is responsive to the output of said frequency dividing means to operate said valve means.

12. In the combination of claim 11 wherein said valve operating means includes a monostable multivibrator coupled to the output of said frequency dividing means and operates said valve means when said monostable multivibrator is in its unstable state.

13. In the combination of claim 12 wherein the number of output pulses from said frequency dividing means is a submultiple of the number of input pulses thereto from said voltage-to-frequency converter and wherein said frequency dividing means includes means to selectively vary said submultiple.

14. In the combination of claim 13 wherein said monostable multivibrator has means for selectively varying its period and which constitutes said means for controlling the period of valve operation.

15. In the combination of claim 12 wherein said frequency dividing means includes a staircase wave generator coupled to the output of said voltage-to-frequency converter and binary pulse countdown means coupled to the output of said staircase wave generator and wherein said valve operating means is responsive to the output of said binary pulse countdown means.

16. In the combination of claim 14 wherein said valve operating means also includes a linear operational amplifier responsive to said voltage, a constant charging current amplifier coupled to the output of said operational amplifier, and said voltage-to-frequency converter is a unijunction relaxation oscillator coupled to said constant charging current amplifier.

17. In the combination of claim 12 wherein said frequency dividing means includes a binary type pulse countdown circuit.

18. In combination with a fuel cell having electrodes and adapted to supply current to a load,
means for supplying reactants to said electrodes,
valve means for controlling said reactant supplying means and adapted, when operated, to permit flow of said reactants at a sufficient rate to purge said fuel cell of accumulated impurities, and
automatic means responsive to the number of ampere-hours supplied by said fuel cell to said load for periodically operating said valve means by opening said valve means when said ampere-hours reach a predetermined value as a function of the amount of reactants used and by closing said valve means after a predetermined time when the electrodes have been cleaned of accumulated impurities, said valve operating means comprising:
a low resistance shunt carrying at least part of said load current,
a voltage-to-frequency converter responsive to the voltage developed across said shunt by the flow of load current therethrough,
a staircase wave generator coupled to the output of said voltage-to-frequency converter,
binary pulse countdown means receiving the output pulses from said staircase wave generator as an input,
a monostable multivibrator coupled to the output of said pulse countdown means, and
means responsive to the switching of said monostable multivibrator to its unstable state for operating said valve means.

19. In the combination of claim 18 and including means for selectively adjusting the period of said monostable multivibrator.

References Cited

UNITED STATES PATENTS

| | | | |
|---|---|---|---|
| 3,256,116 | 6/1966 | Justi et al. | 136—86 |
| 3,317,348 | 5/1967 | Winsel | 136—86 |

WINSTON A. DOUGLAS, Primary Examiner

H. A. FEELEY, Assistant Examiner